(12) United States Patent
Shin

(10) Patent No.: US 7,375,991 B2
(45) Date of Patent: May 20, 2008

(54) POWER CONTROL DEVICE

(75) Inventor: Jong Sik Shin, Goomi-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/482,824

(22) Filed: Jul. 10, 2006

(65) Prior Publication Data

US 2007/0040541 A1 Feb. 22, 2007

(30) Foreign Application Priority Data

Aug. 16, 2005 (KR) ............ 10-2005-0074886

(51) Int. Cl.
*H02M 7/06* (2006.01)
*H02M 7/10* (2006.01)
(52) U.S. Cl. ............... 363/59; 363/89
(58) Field of Classification Search ............ 363/59, 363/61, 89, 126, 143; 307/110; 323/299, 323/300
See application file for complete search history.

(56) References Cited

U.S. PATENT DOCUMENTS 3,906,333 A 9/1975 Kalmanash

| | | | |
|---|---|---|---|
| 4,500,923 A | 2/1985 | Duvall et al. | |
| 4,837,672 A * | 6/1989 | Donze | 363/143 |
| 5,572,415 A * | 11/1996 | Mohan | 363/61 |
| 6,137,700 A * | 10/2000 | Iida et al. | 363/89 |

FOREIGN PATENT DOCUMENTS

| EP | 0 453 180 A2 | 10/1991 |
|---|---|---|
| EP | 0 521419 A2 | 1/1993 |
| KR | 10-2002-0070680 A | 11/2002 |

* cited by examiner

*Primary Examiner*—Gary L. Laxton
(74) *Attorney, Agent, or Firm*—Birch, Stewart, Kolasch & Birch, LLP

(57) ABSTRACT

Provided is a power control device comprising; a power input portion to which an alternating current is supplied; a plurality of diodes for rectifying a power supplied from the power input portion; a first capacitor unit and a second capacitor unit for charging/discharging a power rectified in the diode to provide a smoothed voltage output; and a switching means to change a voltage supplied in the first capacitor and the second capacitor during the main/sub periods in compliance with a voltage level of a power applied in the power input portion.

14 Claims, 4 Drawing Sheets

POWER CONTROL DEVICE

BACKGROUND OF THE INVENTION

1. Field of the Invention

The present invention relates to a power control device, more particularly, to a power control device capable of operating an electronic device at a low voltage state by controlling a power supply in accordance with an input voltage.

2. Description of the Related Art

A typical example of an electronic device is a video display device such as TV and monitor.

In general, an operational voltage range of a video display device is different in compliance with voltage standard by nations. In other words, an image display device normally operates above about 80V in the areas of the US and Japan of a 110V voltage standard, and the video display device operates above about 180V in the areas of Korea and European countries of a 220V voltage standard.

However, recently, the electronic devices are designed to use both voltages of 110V and 220V. Therefore, the electronic devices operate above about 80V.

A power control device of a general video display device will be described with reference to the accompanying drawings.

FIG. 1 is a schematic of a related power control device.

As shown in FIG. 1, a related power control device comprises: a power input portion 10 for supplying a power; a rectifier 20 for rectifying and smoothing a power supplied through the power input portion 10; a power control unit 30 receiving a rectified and smoothed voltage by the rectifier 20 to control a power; and a transformer 40 receiving a rectified and smoothed voltage by the rectifier 20 to emit a power supplied to the first side into the second side in accordance with a control of the power control unit 30.

Here, the rectifier 20 includes a rectifying diode BD rectifying an input power through the power input portion 10 and a capacitor C1 for smoothing the rectified voltage through the rectified diode BD.

In addition, the one end of the switching transformer 40 is connected to the output terminal of the rectifier 20, and the other end is connected to the power control unit 30 to include a resistor R for supplying a rectified and smoothed voltage to the power control unit 30 through the rectifier 20.

The related power control device having the above structure operates as follows;

The power is received from the power input portion 10, and it is rectified through the rectifying diode BD regardless of the main(+)/sub(−) periods of a voltage input. The rectified voltage goes through the power input portion 10, and it is charged and switched in the capacitor C1.

In addition, a rectified and smoothed voltage is provided to the power control unit 30 through the resistor R.

A rectified power through the rectifier 20 is not just provided to the transformer 40, but also connected to the power control unit 30 to supply a rectified power in the rectifier 20 to the second side in accordance with a power control of the power controller 30.

However, there was a problem that if the voltage of an input power is lowered below 80V, the power controller 30 does not operate or the image display device turns off by the operations of an overload circuit (not shown). Even the power voltage goes back to normal, a user have to re-enter the power key to operate the image display device.

SUMMARY OF THE INVENTION

It is an object of the present invention to provide a power control device controlling a power capable of operating electronic devices normally even if a voltage of an input power is provided irregularly.

A power control device according to the present invention comprises: a power input portion to which a power is supplied; a rectifier for rectifying a power applied in the power input portion and outputting a smoothed voltage; and a switching means controlled such that voltage output in the rectifier is changed in compliance with a voltage of a power applied in the power input portion.

In addition, a power control device according to the present invention comprises: a power input portion to which a power is supplied; a rectifier including a plurality of diodes and a plurality of capacitors to purify a power applied in the power input portion and to output a smoothed voltage; an input voltage detector for detecting a voltage of a power applied in the power input portion; and a switching means which is controlled such that a voltage charged in the plurality of capacitors is changed in compliance with the voltage detected in the input voltage detector.

Moreover, a power control device according to the present invention comprises; a power input portion to which an alternating current is supplied; a plurality of diodes for rectifying a power supplied from the power input portion; a first capacitor unit and a second capacitor unit for charging/discharging a power rectified in the diode to output a smoothed voltage; and a switching means to change a voltage supplied in the first capacitor and the second capacitor during the main/sub periods in compliance with a voltage level of a power applied in the power input portion.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
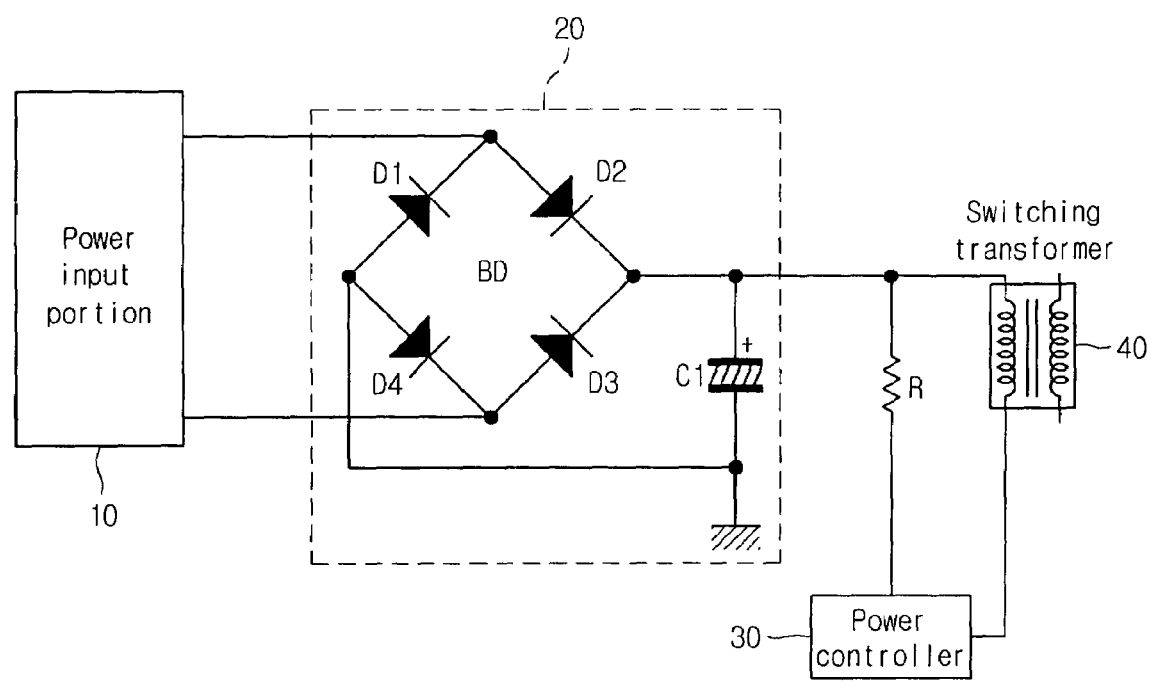
FIG. 1 is a schematic of the Related power control device.
Figure 2:
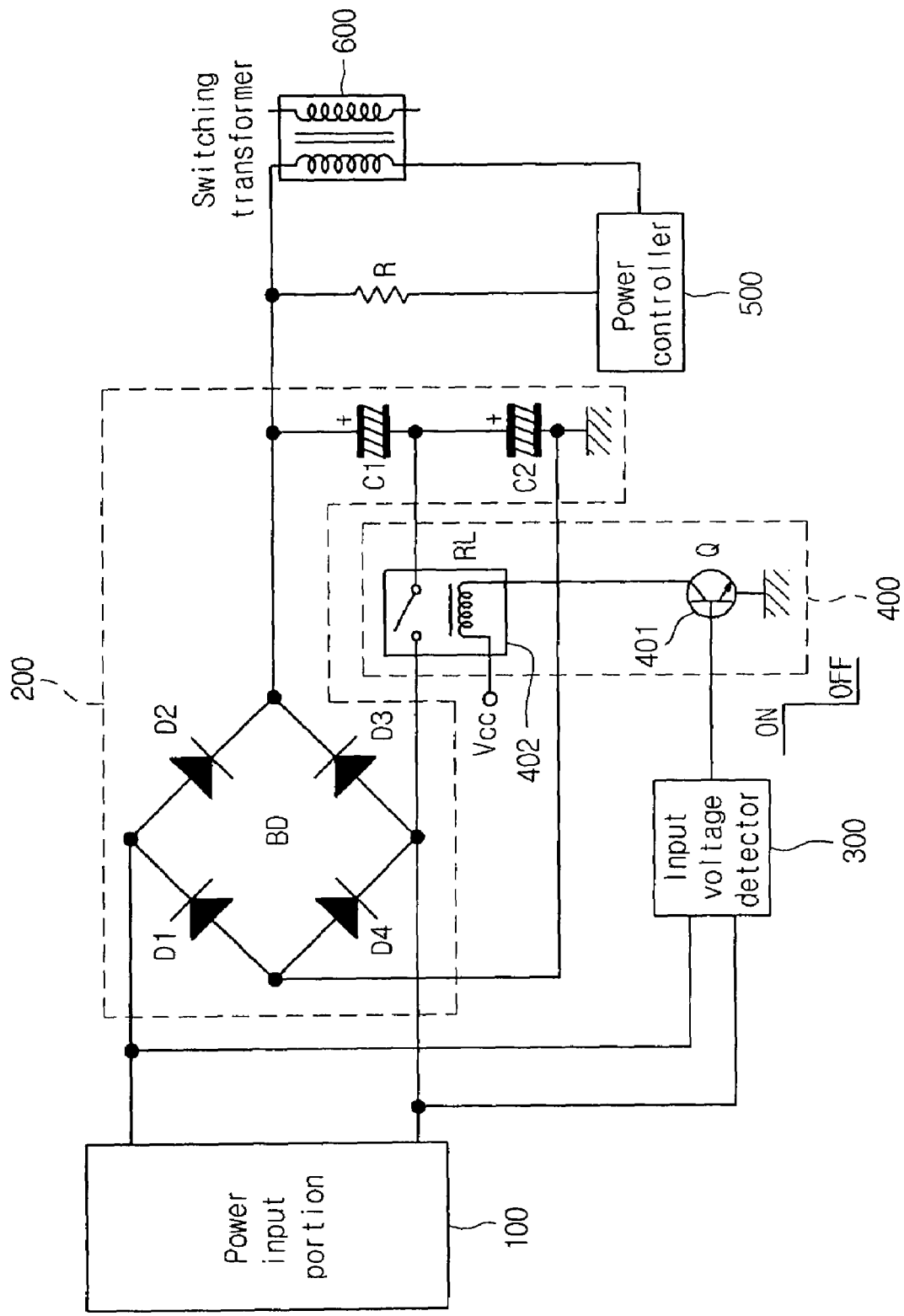
FIG. 2 is a schematic showing a power control device in compliance with the present invention.
Figure 3:
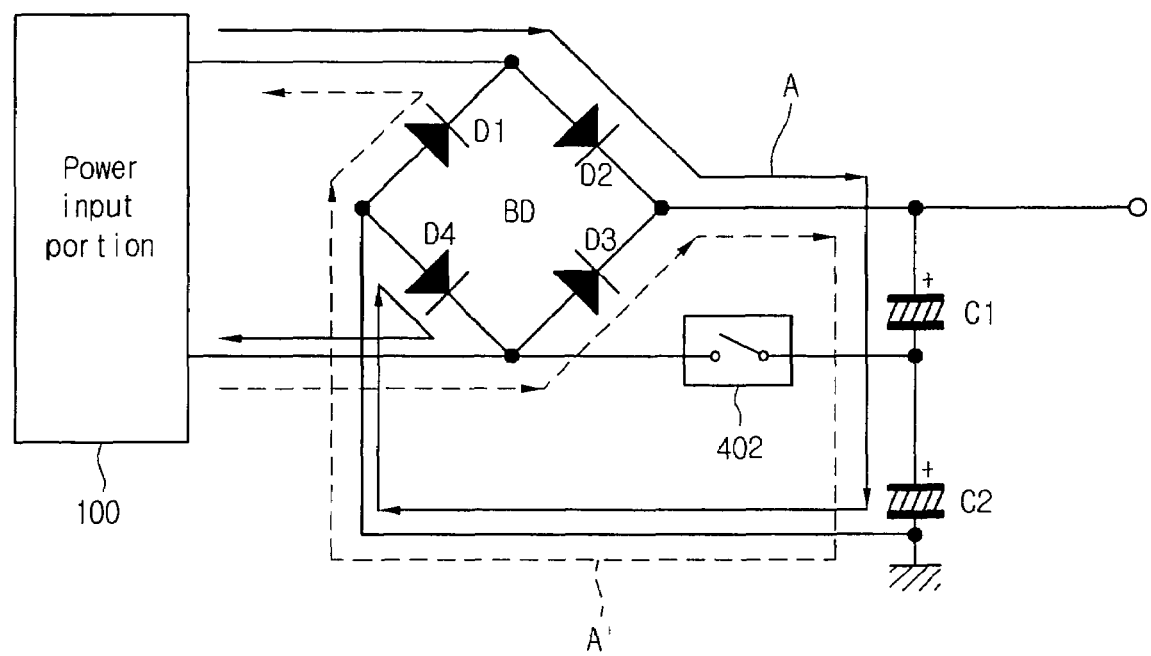
FIG. 3 is a schematic of a power flow when a power control device according to the present invention is operated at a higher voltage.
Figure 4:
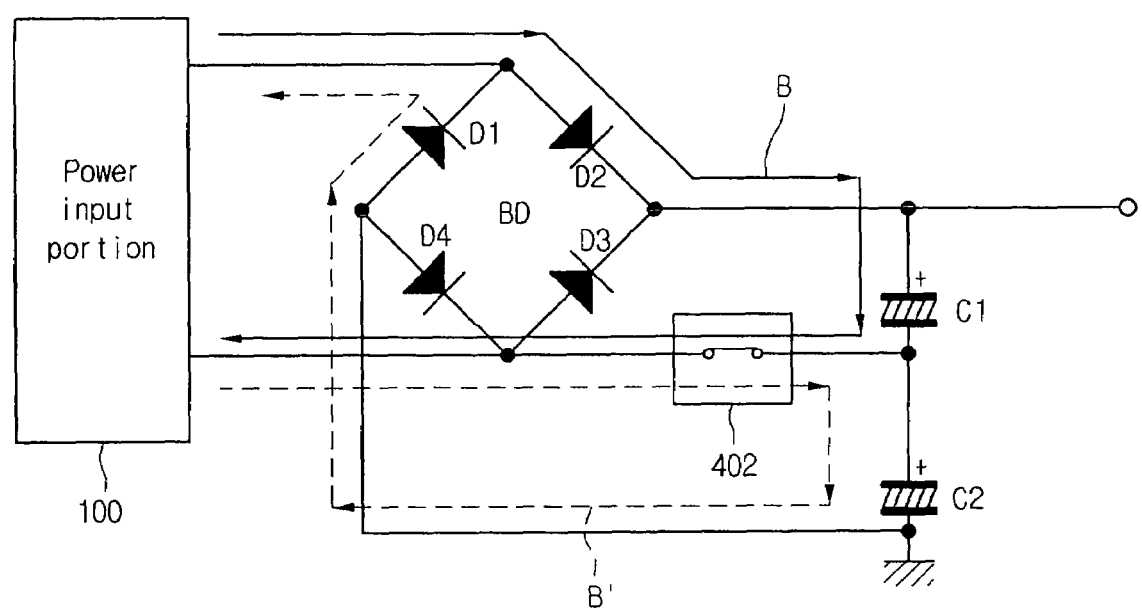
FIG. 4 is a schematic a power flow when a power control device according to the present invention operates at a lower voltage.

FIG. 2 is a schematic showing a power control device in compliance with the present invention, FIG. 3 is a schematic showing a power flow when the power control device complying to the present invention operates at a higher voltage, and FIG. 4 is a schematic showing a power flow when the power control device complying to the present invention operates at a lower voltage.

As shown in FIG. 2, a power control device complying to the present invention comprises: a power input portion 100 to which a power is supplied; an input voltage detector 300 for detecting a voltage of a power input from the power input unit 100; a rectifier 200 for rectifying and smoothing a power input from the power input portion 100 and a switching portion 400 controlling the operations of the rectifier 200 in compliance with a detecting result detected in the input voltage detector 300.

Meanwhile, a power output from the rectifier 200 is provided to the power control unit 200 and the switching transformer 600.

The switching transformer 600 has an end connected to the power control unit 500 and another end connected to the rectifier 200 to provide a power to the electronic devices. In addition, the resistor R has an end connected to the rectifier 200 and the other end connected to the power control unit 500 to provide a rectified and smoothed power in the rectifier 200 to the power control unit 500.

Here, the rectifier 200 includes a rectifying diode BD for rectifying a voltage input through the power input portion 100 and the first and the second capacitors C1 and C2 for receiving the power by a main(+)/sub(−) period of a voltage input through the power input portion 100 in compliance with a switching operation of the switching portion 400 to charge/discharge a voltage for smoothing it. The plurality of rectifying diodes BD are used, and the first and the second capacitors C1 and C2 use a plurality of capacitors, respectively.

In addition, the switching portion 400 includes a switching portion 401 which turns on/off in compliance with a voltage level detected by the input voltage detecting portion 300, and a rectifying switching unit 402 which turns on/off in compliance with the switching unit 401 to change a voltage output through the rectifying unit 200 by a rectification and a smoothing.

Here, the switching unit 401 constitutes a transistor and the rectifying switching unit 402 may constitute a relay. It is convenient that a relay is used in the rectifying switching unit 402.

The operation of a power control device complying to the present invention now will be described.

First, if the power is supplied through the power input portion 100, the input voltage detector 300 determines whether the power input through the power input portion 100 is greater, smaller than or the same than as a preset voltage (for example, 80V).

In other words, according to the detection result of the input voltage detector 300, if an input voltage received through the power input portion 100 is greater than or the same as the preset voltage, a low signal is applied to the base of a switching unit 401 of the switching portion 400, and the switching unit 401 maintains an off-state. Moreover, as the switching unit 401 maintains the off-state, the rectifying unit 402 becomes an off-state.

Accordingly, as shown in FIG. 3, if the rectifying switch unit 402 is at an off-state, the input voltage receive from the power input portion 100 is provided in a solid line direction A during a main (+) half-period to charge the first and the second capacitors C1 and C2. The voltage charged in the first and the second capacitor C1 and C2 is provided to the power control unit 500 and the switching transformer 600 through the resistor R to perform a power supply to the electronic devices.

In addition, an input voltage input from the power input portion 100 is provided in a dotted line direction A' during a sub (−) half-period to charge the first and the second capacitors C1 and C2. The voltage charged in the first and the second capacitors C1 and C2 is provided to the power control unit 500 and the switching transformer 600 through the resistor R to supply a power to the electronic devices.

Meanwhile, if the voltage detected in the input voltage detecting unit 300 is less than a preset voltage (for example, 80V), the input voltage detecting unit 300 provides a high signal to a base of the switching unit 401 to turn on the switching unit 401.

In addition, as the switching unit 401 is turned on, the rectifying switch unit 402 becomes a turn-on state.

Referring to FIG. 4, a power is provided through the power input portion 100 during a main (+) half-period to charge the first capacitor C1. The power charged in the first capacitor C1 is provided to the power control unit 500 and the switching transformer 600 to provide a power supply to the electric devices.

In addition, the power is provided like a dotted line B' during a sub (−) period through the power input unit 100 to perform a charge in the second capacitor C2, and a power charged in the second capacitor C2 is provided in the power control unit 500 and the transformer 600 to perform a power supply.

Accordingly, as a twice rectified and smoothed voltage is charged in the first and the second capacitors C1 and C2, the charged voltage is applied to the power control unit 500 and the switching transformer 600 through the resistor R.

Accordingly, even if the lower voltage is supplied as an input power than the preset voltage is supplied as an input power, the power control device supplies a power of more than the predetermined voltage so that the electronic device maintains a continuous use state.

As described above, a power control device complying to the present invention detects an input voltage. If the detected voltage is greater than the predetermined voltage, a normal operation is maintained, and if the detected voltage is less than the pre-established voltage, the voltage automatically increases to operate the electronic devices at a low voltage.

What is claimed is:

1. A power control device comprising:
a power input portion to which a power is supplied;
a rectifier for rectifying a power applied in the power input portion and providing a smoothed voltage output;
a switching means controlled such that a voltage output in the rectifier is changed in compliance with a voltage supplied by the power input portion; and
a power controller connected to an output end of the rectifier to control supply of the rectified power to a load, the power controller stopping operating when the switching means is off and the voltage supplied by the power input portion is lower than a stop voltage,
wherein the switching means is turned on when the voltage supplied by the power input portion is lower than the stop voltage, thereby keeping the power controller to control the supply of the rectified power to the load.

2. The power control device of claim 1, wherein the rectifier comprises a plurality of diodes controlling a direction of a current in compliance with a main period and a sub period of a power and a plurality of capacitors charging and discharging a voltage output from the plurality of diodes.

3. The power control device of claim 1, wherein the switching means changes the number of capacitors to which a voltage is applied in the main period and the sub period in compliance with a voltage of the applied power.

4. The power control device of claim 1, wherein the switching means comprises: an input voltage detector for detecting the voltage supplied by the power input portion, and a switcher controlling an operation of the rectifier in accordance with a detection result through the input voltage detector.

5. A power control device comprising:
- a power input portion to which a power is supplied;
- a rectifier including a plurality of diodes and a plurality of capacitors to rectify a power supplied by the power input portion and to provide a smoothed voltage output;
- an input voltage detector for detecting a voltage supplied by the power input portion;
- a switching means which is controlled such that a voltage charged in the plurality of capacitors is changed in compliance with a voltage detected in the input voltage detector;
- a power controller connected to an output end of the rectifier to control supply of the rectified power to a load, the power controller stopping operating when the switching means is off and the voltage supplied by the power input portion is lower than a stop voltage,
- wherein the switching means is turned on when the voltage supplied by the power input portion is lower than the stop voltage, thereby keeping the power controller to control the supply of the rectified power to the load.

6. The power control device of claim 5, wherein the switching unit applies a voltage at every main and sub period of a power to the plurality of capacitors in a case that the voltage detected in the input voltage detector is greater than the stop voltage, and a voltage is applied to the main period of a power to a part of the plurality of capacitors in a case that the detected voltage is less than the stop voltage, and a voltage is applied to the sub period to rest of the plurality of capacitors.

7. The power control device of claim 6, wherein the switching unit comprises a switching portion which turns on/off in compliance with the voltage detected in the input voltage detector and a rectifying switcher controlling a direction of applying a voltage of the rectifier in compliance with the on/off of the switching unit.

8. The power control device of claim 7, wherein the switching portion consists of a transistor.

9. The power control device of claim 7, wherein the rectifying switching portion consists of a relay.

10. A power control device comprising;
- a power input portion to which an alternating current is supplied;
- a plurality of diodes for rectifying a power supplied from the power input portion;
- a first capacitor unit and a second capacitor unit for charging and discharging a power rectified in the diode to output a smooth voltage;
- a switching means to change a voltage supplied in the first capacitor and the second capacitor during a main period and a sub period in accordance with a voltage of a power supplied by the power input portion; and
- a power controller connected to the diodes to control supply of the rectified power to a load, the power controller stopping operating when the switching means is off and the voltage supplied by the power input portion is lower than a stop voltage,
- wherein the switching means is turned on when the voltage supplied by the power input portion is lower than the stop voltage, thereby keeping the power controller to control the supply of the rectified power to the load.

11. The power control device of claim 10, wherein the switching means is supplied by a voltage of the main period and a voltage of the sub period in the first capacitor unit and the second capacitor unit in case that the voltage supplied by the power input portion is greater than the stop voltage.

12. The power control device of claim 10, wherein the switching means is supplied by a voltage of the main period in the first capacitor unit if the voltage supplied by the power input unit is less than the stop voltage, and the switching means is supplied by a voltage of the sub period in the second capacitor.

13. The power control device of claim 10, wherein the switching means comprises: an input voltage detecting unit for detecting the voltage supplied by the power input portion, and a switching unit for controlling an operation of the rectifier in compliance with the detection results detected in the input voltage detection unit.

14. The power control device of claim 13, wherein the switching unit comprises: a switching unit which turns on/off in compliance with the voltage detected in the input voltage detection unit, and a rectifying switching unit for controlling a voltage applying direction of the rectifier in compliance with an on/off of the switching unit.

* * * * *